Patented Aug. 31, 1954

2,688,036

UNITED STATES PATENT OFFICE 2,688,036

CONDENSATION PRODUCTS OF TRIHYDROXY BENZOIC ACID AND FORMALDEHYDE

Ladislaus Arthur Hahn, Malmo, Sweden, and Janos Fekete, Lorena, Brazil, assignors to Aktiebolaget Ferrosan, Malmo, Sweden, a corporation of Sweden No Drawing. Application September 9, 1952,
Serial No. 308,702

Claims priority, application Sweden
December 9, 1949

5 Claims. (Cl. 260—520)

This application is a continuation-in-part of our co-pending application No. 199,564, filed December 6, 1950, now abandoned.

The present invention relates to new biologically active diphenylmethane derivatives and to a method of making the same.

An enzyme which is capable of splitting mucopolysaccharides and amongst them particularly the hyaluronic acid has been discovered i. a. in the testicles and the sperm of mammals, furthermore in the leech, in serpents' and insects' poisons and in certain bacteria. The enzyme has been denominated mucinase but the name has later been changed to hyaluronidase or mucopolysaccharase, respectively.

The substrate hyaluronic acid is rather common in the animal organism. Among the most important source may be mentioned the interfibrillar substance of mesenchymal tissues, especially of the connective tissues, furthermore the vitreous body of the eye, the synovia and the gel that surrounds the ovum on its way through the oviduct. Another important substrate for the hyaluronidase, the chondroitin sulfuric acid, is a substantial component of all sorts of cartilage, thus also of the cartilage of the joints.

The splitting effect of the hyaluronidase on the hyaluronic acid has been elucidated to a large extent: the highly polymeric acid is depolymerized and split into smaller units, the glucosidic bonds between the elements of the hyaluronic acid, i. e. the glucuronic acid and the N-acetyl glucos amine, being hydrolyzed. In the complete splitting up of the hyaluronic acid to monosaccharide units also other enzymes are active. One of these enzymes has been isolated from bulls' testicles and has been denominated mucooligosaccharase. The splitting of the hyaluronic acid and of other mucopolysaccharides, for instance the chondroitin sulfuric acid, through hyaluronidase may be experimentally shown and quantitatively determined for instance (a) by observing the decrease in viscosity of the substrate or (b) determining the reducing groups which are liberated at the hydrolysis. There is also a biological method of determination which is based upon the influence of the hyaluronidase on the permeability of the skin, said influence being explained in the following.

The effect of the hyaluronidase in vivo corresponds to its effect on mucopolysaccharides in vitro: for instance the hyaluronic acid of the skin is split by the action of hyaluronidase, which is brought into the tissue in one way or other, and looses its high viscosity. This causes the skin to become much more permeable. This increase of the permeability is rather general and results therein, that as well physiological as non-physiological substances, such as water, salts, added chemical compounds of all kinds, coloring matters, poisons, bacteria and virus will spread many times quicker in the tissue if hyaluronidase is present. This may easily be shown experimentally by intracutaneous injection of 0.2 millilitre of India ink for instance on one side of the back of a rabbit, the same amount of ink to which there has been added some micrograms of hyaluronidase being injected on the other side. The ink to which no hyaluronidase has been added spreads only very slowly in the skin. The ink which has been mixed with the enzyme spreads in a few minutes over an area of 200 cm.$^2$ or more. That which has been said about the effect of the hyaluronidase upon the permeability of the skin holds true also in respect of other kinds of mesenchymal tissues.

The high viscosity of the synovial fluid depends to a great extent on the hyaluronic acid and the same holds true i. a. of the vitreous body of the eye and of the gel that surrounds the ovum in the oviduct. The effect of the hyaluronidase upon such materials is to make them lose their viscosity so that they become fluent.

The hyaluronidase of certain bacteria is of great importance for various reasons. Some of the pathogenic bacteria containing hyaluronidase, such as streptococci, are connected with certain types of rheumatic diseases. Since the viscosity of the synovial fluid depends mainly on its content of hyaluronic acid and since the cartilage of the joints contains chondroitin sulfuric acid it was assumed that at least some forms of rheumatic and other joint diseases are caused directly or indirectly by hyaluronidase.

The effect of the hyaluronidase upon connective tissues results therein that bacteria containing or producing this enzyme will penetrate through the organism much easier than other bacteria so that the risk of infection is highly increased. The hyaluronidase-bearing bacteria need not necessarily be pathogenic themselves, or they may be pathogenic only to a small degree—nevertheless they may mean a great danger to the organism by facilitating the penetration of other non-physiological substances, such as other bacteria, virus etc., into tissues and organs. This is of particular importance since many highly pathogenic virus show a rather low penetration capability. If the organism is infected by hyaluronidase-producing bacteteria infection with the said agents may result.

Since hyaluronic acid is present also in capillary walls the capillary permeability is influenced by hyaluronidase. The hyaluronidase may therefore promote or facilitate the penetration of infective substances through the capillaries.

Certain substances inhibiting the effect of the hyaluronidase are known. As an example carboxy-p-benzoquinone, rutin, ascorbic acid, heparin, hexylresorcinol, certain sera fractions and nitrates of hyaluronic acid may be mentioned.

It has now been discovered that an inhibition of the action of hyaluronidase which is many times stronger than that of the above-mentioned known substances is developed by certain diphenylmethane derivatives. These derivatives are obtained by condensing with formaldehyde trihydroxy benzoic acids selected from the group consisting of 2.3.4-, 2.3.5-, 2.4.5- and 2.4.6-trihydroxy benzoic acid. The hyaluronidase inhibiting power of these condensation products is more than 3000 times greater than that of salicylic acid and more than 30 times higher than that of any inhibitor earlier described. Clinical trials of these compounds showed that they are of very great value in the treatment of rheumatoid arthritis and have also a pronounced effect on infectious diseases induced by hyaluronidase producing bacteria.

The inhibitors according to the invention may also be introduced into the organism in a suitable manner, as per os, by superficial treatment or by subcutaneous, intramuscular or intraperitoneal injection etc. in order to prevent the spreading effect of the hyaluronidase in poisonings and infections. As mentioned above serpents' and insects' poisons and various pathogenic bacteria contain hyaluronidase and in part also other mucopolysaccharases. If these enzymes get into the organism such as by biting or infection they hydrolyse the hyaluronic acid of the skin and other tissues so that the poison or the bacteria are more easily infiltrated in the organism. Also infection with other infective substances which are free from hyaluronidase, such as bacteria and virus, spreads much quicker in the organism if the same is infected with hyaluronidase-bearing bacteria. The inhibitors according to this invention inhibit the action of the hyaluronidase of poisons and bacteria upon tissues and thus prevent or limit infection. The action differs principally from the treatment with antitoxins or anti-sera (no specificity).

The compounds which are the matter of the present invention are prepared in the following manner:

The trihydroxybenzoic acid is dissolved or suspended in a suitable solvent (for instance water, alcohol, dioxan, ether, acetic acid, hydrochloric acid, sulfuric acid). Then the formaldehyde solution is added either all at one time or successively in the course of the reaction. The latter mode of operation is used in certain cases in order to control the condensation reaction.

Sometimes the condensation will occur already at room temperature and in absence of condensation agents. However, in most cases it is preferable, or necessary, that a condensation agent is present. The reaction then occurs either at room temperature, or at an elevated temperature, and the reaction period may vary from some minutes up to several hours depending upon the reactive power of the compound in question, the concentration of the condensing agent and other conditions. As condensation agents mineral acids (for instance hydrochloric acid, sulfuric acid) or alkalis (for instance alkali hydroxides) may be used.

If the starting material is sensitive to air oxygen the reaction should preferably be carried out in an inert atmosphere. Since the reaction mostly takes place in a heterogeneous phase the reaction mix should be vigorously stirred.

As generally the reaction product is considerably less soluble than the starting material, purification of the reaction product may often be carried out taking advantage of the said difference in solubility.

The production of certain of the contemplated substances may sometimes be carried out in such a manner that the carboxylic groups are introduced after the condensation has been effected.

The product of the condensation of the trihydroxy benzoic acids mentioned with formaldehyde under conditions here described was found to be a mixture of simple diphenylmethane derivatives and their polycondensation products. The proportion between the yield of diphenylmethane derivatives and of that of polycondensed products depends on (a) the position of the OH-groups in the benzene ring and (b) the conditions used. For example 2.4.6-trihydroxy benzoic acid has a pronounced tendency to the building of polycondensed products. The presence of condensing agents, increasing concentration of mineral acids, increasing temperature and increasing time of reaction generally favour the production of polycondensed products. The separation of the simple diphenylmethane derivatives from the corresponding polycondensed products is rather difficult. Fractionation with organic solvent, for example alcohol, gives in some cases good results.

We found that also the polycondensed products mentioned above show very pronounced inhibitory action on hyaluronidase. In most cases the inhibitory power of the polycondensed product is somewhat higher than the inhibitory power of the corresponding diphenylmethane derivative.

*Example 1*

2.2'.3.3'.4.4'-hexahydroxy - 5.5' - dicarboxy diphenylmethane may be produced in the following manner: 2 mols of 2.3.4-trihydroxy benzoic acid are mixed with water, and on a boiling water bath there is added with agitation and in a nitrogen atmosphere a molar weight of formaldehyde. In absence of a condensation agent the reaction takes place when heating during 3 hours. The mixture is then cooled and the precipitate is filtered off and washed with cold water. Relative hyaluronidase inhibitory power: 3500 (salicylic acid=1).

*Example 2*

2.2'.4.4'.6.6'-hexahydroxy - 3.3' - dicarboxy diphenylmethane may be produced in the following manner: 2 molar weights of phloroglucinol and 1 molar weight of formaldehyde are dissolved in water. While stirring the solution hydrochloric acid is added at room temperature and after the appearance of the precipitation the whole mixture is stirred a quarter of an hour at 40° C. The precipitate is filtered off and is suspended in water. The condensation product is extracted by means of ether, the ethereal solution is evaporated to dryness, dissolved in ethylacetate and precipitated by means of benzene. The substance is suspended in 10 times its quantity of a 50% sodium bicarbonate solution and is heated during 4 hours on a boiling water bath in a carbon dioxide atmosphere. The product is neutralized by means of hydrochloric acid and is purified by repeated precipitations. Relative inhibitory power: 3875.

Example 3

In 100 grams of cold 50% sulfuric acid 17.0 grams of 2.4.6-trihydroxy benzoic acid are suspended, whereupon 4 grams of a 40% formaldehyde solution are added. The reaction mixture is boiled during 5 hours with vigorous agitation. The warm product is filtered through a glass filter and the precipitate is pulverized and washed with hot water until free from sulfuric acid. The product obtained consists to a great part of polycondensed products built up of 2.2'.4.4'.6.6'-hexahydroxy-3.3'-dicarboxy diphenylmethane units. Relative inhibitory power: 4075.

Example 4

In 100 grams of diluted hydrochloric acid (1:1) 17.0 grams of 2.4.5-trihydroxy benzoic acid are suspended. After addition of 4 grams of 40% formaldehyde solution the mixture is boiled during an hour. The isolation of the reaction product is carried out according to Example 3. Yield: 14.0 grams of 2.2'.5.5'.6.6'-hexahydroxy-3.3'-dicarboxy diphenylmethane with some contamination of polycondensed products. Relative inhibitory power: 3100.

Example 5

17.0 grams of 2.4.5-trihydroxy benzoic acid are condensed with formaldehyde according to the method given in Example 3. Yield: 12.5 grams. The product obtained is a mixture of 2.2'.5.5'.6.6'- hexahydroxy - 3.3' - dicarboxy diphenylmethane and its polycondensed products. Relative inhibitory power: 3150.

Example 6

In 100 grams of cold 50% sulfuric acid 17.0 grams of 2.3.5-trihydroxy benzoic acid are suspended, whereupon 4 grams of a 40% formaldehyde solution are added. The reaction mixture is boiled during 5 hours with vigorous agitation. The warm product is filtered through a glass filter and the precipitate is pulverized and washed with hot water until free from sulfuric acid. The product obtained consists of a mixture of 2.2'.3.3'.6.6'-hexahydroxy-4.4'-dicarboxy diphenylmethane and its polycondensed products. Relative inhibitory power: 4000.

What we claim is:

1. Compounds of the formula

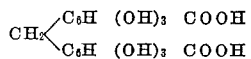

and their polycondensed products, which are condensation products of formaldehyde and a trihydroxy benzoic acid in which at least one of the hydroxy groups is in ortho position to the carboxylic group.

2. 2.2'.3.3'.4.4'-hexahydroxy-5.5'-dicarboxy diphenylmethane and its polycondensed products.

3. 2.2'.3.3'.6.6'-hexahydroxy-4.4'-dicarboxy diphenylmethane and its polycondensed products.

4. 2.2'.5.5'.6.6'-hexahydroxy-3.3'-dicarboxy diphenylmethane and its polycondensed products.

5. 2.2'.4.4'.6.6'-hexahydroxy-3.3'-dicarboxy diphenylmethane and its polycondensed products.

References Cited in the file of this patent

UNITED STATES PATENTS

| Number | Name | Date |
|---|---|---|
| 706,354 | Summers | Aug. 5, 1902 |
| 2,042,343 | Kyrides | May 7, 1934 |

OTHER REFERENCES

Caro, Beilstein (Handbuch, 4th Ed.), vol. 10, page 588 (1927).

Mohlau et al.: Beilstein (Handbuch, 4th Ed.), vol. 10, p. 594 (1927).